Dec. 14, 1948.  J. V. SHARP ET AL  2,456,333
PHOTOGRAMMETRIC PROJECTION APPARATUS AND
DIAPOSITIVE ADJUSTMENT MEANS
Filed Oct. 24, 1947  2 Sheets-Sheet 1
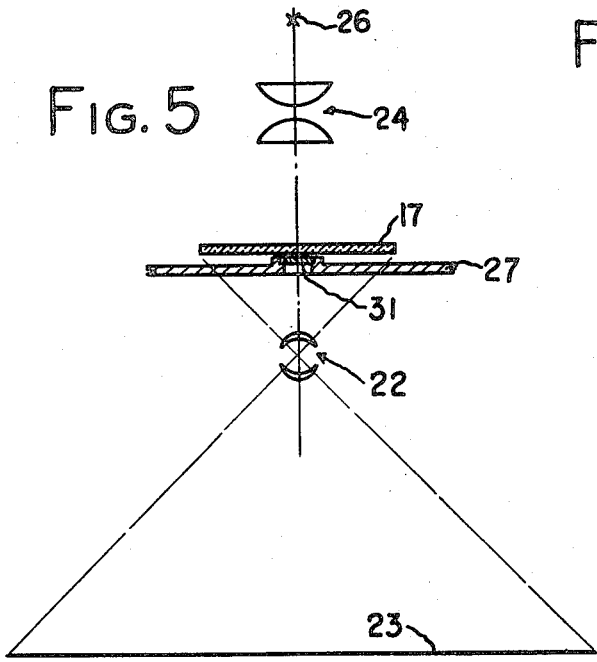
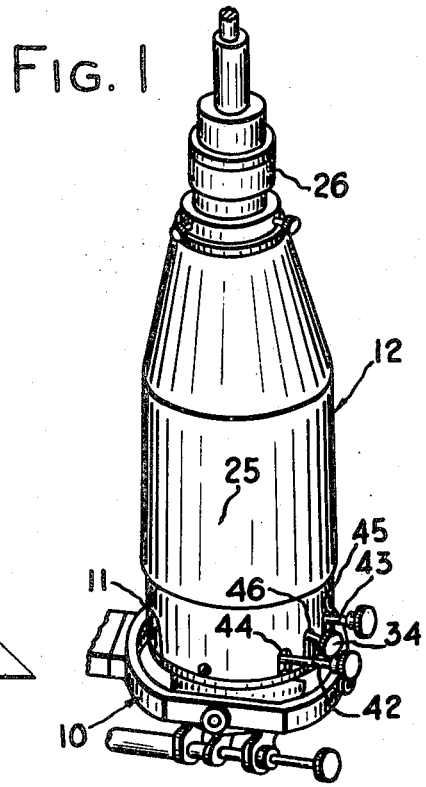
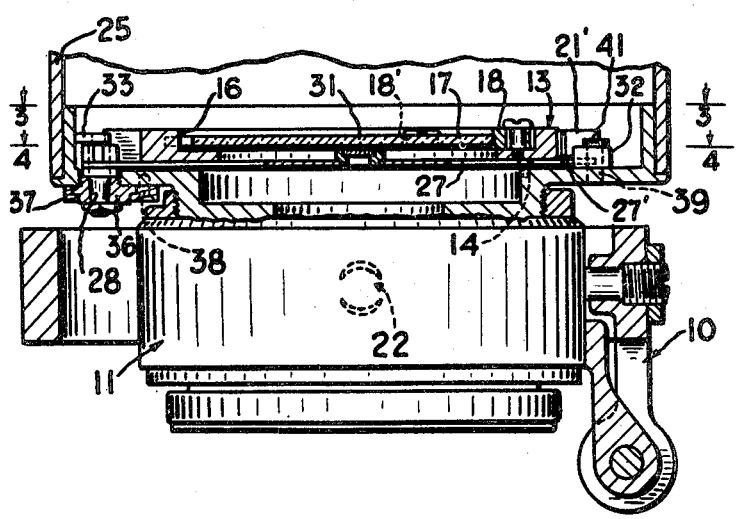
Inventor
J. V. SHARP
O. W. BOUGHTON
Attorney

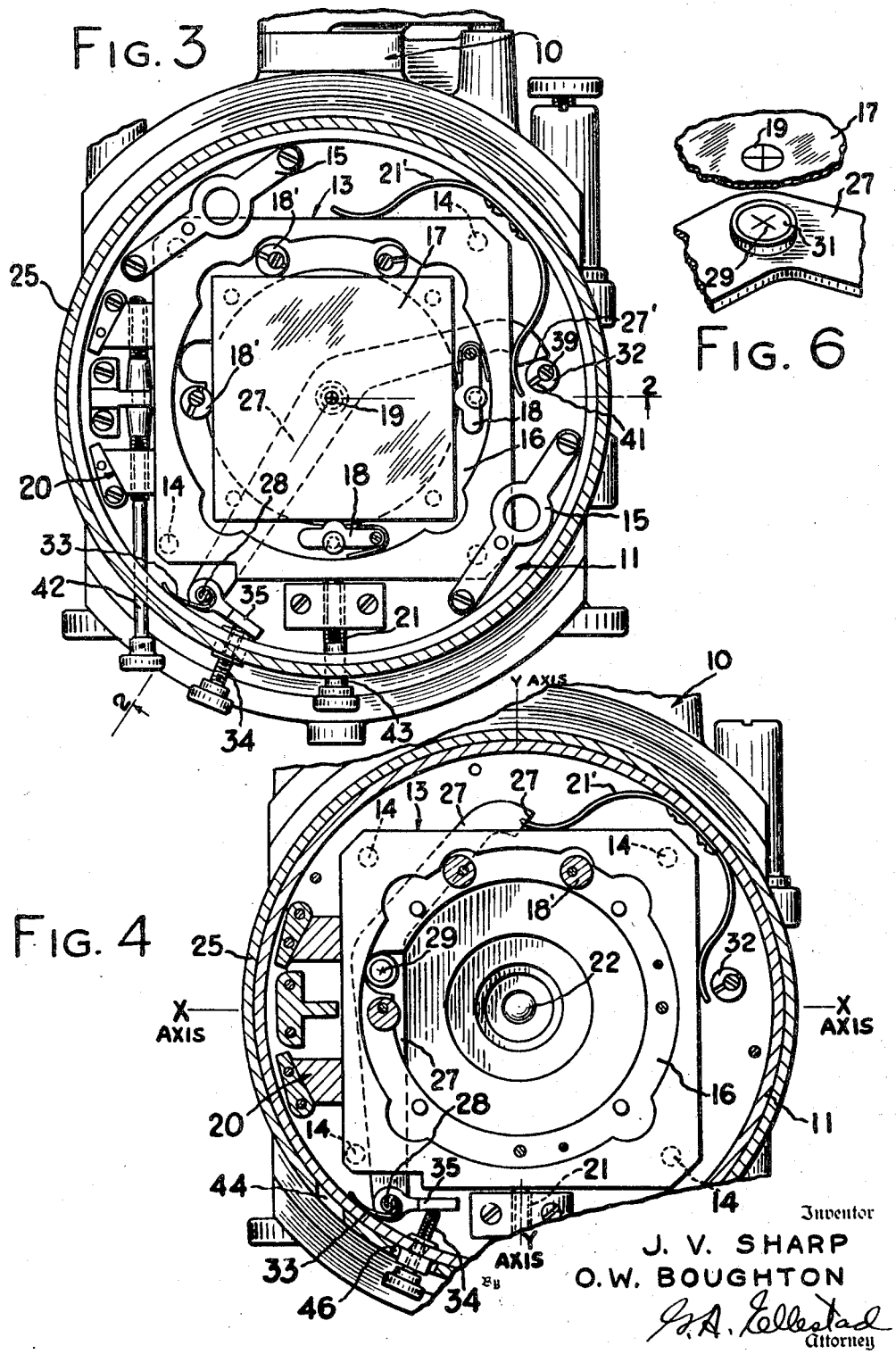

Patented Dec. 14, 1948

2,456,333

UNITED STATES PATENT OFFICE 2,456,333

PHOTOGRAMMETRIC PROJECTION APPARATUS AND DIAPOSITIVE ADJUSTMENT MEANS

John V. Sharp, Brighton, and Olin W. Boughton, Victor, N. Y., assignors to Bausch & Lomb Optical Company, Rochester, N. Y., a corporation of New York Application October 24, 1947, Serial No. 781,964

4 Claims. (Cl. 88—24)

The present invention relates to improvements in optical projectors and more particularly to projectors for the transparencies or diapositives used in photogrammetric apparatus.

As precision performance of photogrammetric apparatus becomes more important with new developments in the art, it is necessary to check more closely and with greater facility the exact centering or alignment of the transparencies, used in the projector, with reference to the optical axis of the projector. Of equal importance, is the ability to check the aforesaid alignment while the projector is in operative condition.

Projectors of the general type represented by the United States Patent No. 2,164,847, granted to O. E. Trautmann on July 4, 1939, are in general use, but the alignment of the principal point of the diapositive with the principal point of the projector is usually checked by a slow and tedious method requiring partial disassembly of the projector and the use of auxiliary equipment, such as a principal point projector, to establish the optical axis in the diapositive plane. An alternative method of checking this alignment is to use a stationary permanently mounted transparent alignment plate under the diapositive but this method involves undesirable refraction and reduction in intensity of the light rays passing through it, and such a plate becomes scratched with use.

It is an object of the present invention to provide a novel device of the above type by which the alignment of the transparencies used in the projector may be quickly tested with regard to the optical axis of said projector.

It is another object to provide such a device by which the transparencies used in the projector may be easily and accurately aligned on the optical axis of the projector by external means without disassembly of any part of the projector.

It is a further object to provide such a device having a relatively simple design which can be manufactured inexpensively while being sturdy and adaptable to all conditions of use.

It is another object to provide such a device wherein the alignment device is permanently incorporated in the projector but may be selectively placed in an operative or inoperative position without disturbing the arrangement of the other parts of the projector or altering its operation.

Further objects and advantages will be apparent to those skilled in this art by reference to the following description and accompanying drawings in which:

Fig. 1 is a perspective view of a projector incorporating a preferred form of this invention, Fig. 2 is a partial vertical sectional view of the lower section of the projector, Fig. 3 is a sectional view of the projector taken on the line 3—3 of Fig. 2, Fig. 4 is a sectional view of the projector taken on the line 4—4 of Fig. 2, Fig. 5 is an optical diagram of the projector, and Fig. 6 is an enlarged fragmentary perspective view of certain details of the invention.

The assembled projector shown in Fig. 1 comprises several subassemblies, namely, the projector supporting mechanism 10, the base member 11 which is rotatably mounted in the supporting mechanism 10, and the illuminating subassembly 12 fitted to the base member 11. The base member 11 carries the posts 14 whereon a movable stage 13 is slidably supported and is held thereon in any preferred manner such as by the spring clips 15 under which the stage 13 may slide. Within a recess 16 in the stage 13 a transparency 17, commonly known as a diapositive, is clamped by any suitable means such as the spring-pressed pivoted levers 18 which urge the diapositive against the fixed position eccentric tapered buttons 18'. On the emulsion side of the diapositive 17 there is placed a suitable center mark 19 which is known in the art as the principal point of the diapositive.

Movement of the stage 13 in two directions substantially normal to each other is provided by suitable means such as a cam mechanism 20, a screw mechanism 21 and a double spring 21' in a well known manner so as to permit alignment of the mark 19 with the optical axis of the projector.

In the base member 11, an objective lens 22 is fixed beneath the diapositive 17 so that an image of the diapositive is formed on an image plane 23 below as shown in Fig. 5. Illuminating means of any suitable form embodying a condenser lens 24 and light source 26 are positioned centrally above the diapositive within a casing member 25 which is detachably secured to the base 11.

A salient feature of this invention is the indicating means for testing the alignment of the principal point 19 of the diapositive with the principal point of the objective lens 22. In the preferred form, such means comprise a movable arm 27, mounted by a pivot member 28 on the base member 11 beneath the stage 13 so as to swing across the optical axis of the projector. The arm 27 carries a suitable index mark 29 fixed on a transparent plate 31 in such a position that the index mark 29 may be swung into alignment with the optical axis of the lens 22. It is desirable that the index mark 29 be different from the center mark 19 either in design or in orientation as shown in Figs. 3 and 4 so as to be separately identifiable when superimposed and projected by lens 22 and viewed on screen 23. Since the customary design of the center mark 19 is a circumscribed cross, comparative identification of the index mark 29 is assured by designing it as a plain cross, the arms of which extend at an acute angle between the arms of the inscribed cross 19 when the marks are superimposed as shown in Fig. 6. The transparent plate 31 is fixed on the arm 27 at an elevation which places the index mark as close as possible to the center mark 19. Stop means comprising an abutment member 32 fixed to the base member 11 are provided for the free end 27' of the arm 27 which arrests swinging motion of the arm at its operative position with the index mark 29 in alignment with the optical axis of the objective lens 22.

The means for moving the arm 27 to operative position includes biasing means of any preferred form such as the torsion spring 33 by which the free end 27' of the arm 27 is urged yieldingly against the abutment member 32. The arm 27 may be swung out of operative position by any suitable actuating means actuated from outside of the casing member 25, which as here shown, comprises a screw extension member 34 bearing against a lug 35 secured to arm 27 so as to move the arm in opposition to the action of the torsion spring 33. The advantage of this resilient means is that the free end 27' of arm 27 always bears with a constant pressure of low magnitude on the abutment member 32 when in operative position.

Utilizing the means for adjusting the arm 27, the index mark 29 is established as a visible reference mark for showing the location of the optical axis of the projector and its position is adjusted as described immediately hereinafter. In both the pivot member 28 and the abutment member 32 are incorporated alignment means for adjusting the arm 27 in two directions which are substantially normal to each other so as to bring the index mark 29 into registry with the optical axis of the objective lens. This means includes an eccentric bushing 36 in which the pivot member 28 is rotatably journaled but axially restrained. A clamping ring 37 surrounds the eccentric bushing and is held in clamping engagement therewith against the base member 11 by screws 38. The eccentric bushing 36 is provided with means for rotating it such as a screw-driver slot, not shown. Also included in the adjusting means is the abutment member 32 which is eccentrically mounted on a stud or screw 39 and a screw-driver slot 41 is provided by which it may be rotated when adjustment is necessary.

To preclude the necessity of disassembly of the projector during adjustment or checking of the diapositive alignment, the control shafts 42 and 43 for the cam mechanism 20 and screw mechanism 21, respectively, are extended through open-ended slots 44 and 45, respectively, in the casing member 25 to the exterior thereof. Operating knobs are attached to the control shafts 42 and 43. Similarly, the screw member 21 for moving the arm 27 is extended by the extension member 34 through an open-ended slot 46 in the casing to an exterior position between the control shafts 42 and 43. Since the slots 44, 45, and 46 are open-ended, the casing member 25 can be removed from the base member without disturbing the control members.

The operation of the device is now explained. Assuming that the index mark 29 on arm 27 is correctly adjusted for registry with the optical axis of the objective lens 22 and the diapositive is properly secured on the stage 13, the arm 27 is swung into operative position by unscrewing the screw member 34 until the free end 27' of the arm contacts the abutment member 32. The arm is held in operating position against the abutment member by the spring 33 so that no distorting stresses may be imparted thereto. With the illumination turned on, the center mark 19 and the index mark 29 are projected simultaneously by the objective lens 22 onto the image plane 23 where both marks appear in the image of the diapositive. It is only necessary then to turn the control shafts 42 and 43 to move the diapositive along its "x" or "y" axes, respectively, for aligning the center mark with the index mark. The "x" axis lies crosswise and the "y" axis lies lengthwise of the support mechanism 10 as shown in Fig. 4. After alignment of the diapositive, the arm 27 is swung back to inoperative position, shown in Fig. 4, by turning the screw member 34 so that pressure is transmitted to the lug 35. When in inoperative position, the arm 27 leaves the field of the objective lens between the diapositive and the objective lens substantially unobstructed and free from light refractive materials or light diminishing elements.

If it is desired to check the alignment of the index mark with respect to the optical axis of the objective lens when in operative position, the illumination is turned on and the position of the projected image of said mark is noted on the image plane 23. Then the base member 11 with its assembled casing member 25 is rotated, meanwhile observing on the image plane whether the index mark moves around. In order to adjust any error in the operative position of the index mark 29, the casing member 25 is removed and the abutment member 32 rotated eccentrically about its holding screw 39 to move the index mark in one direction. The clamping ring 37 is also loosened and the eccentric bushing 36 rotated until the combined adjustments, being substantially normal to each other, produce an immobile image of the index mark on the image plane while the base member is rotated. Since the alignment of the index mark as above described is a manufacturing adjustment primarily, and is seldom needed as compared to the number of alignment tests required for the diapositive, no hardship is involved by the necessity of disassembling the casing member for this purpose only.

From the preceding description, it will be apparent that there is provided a simple, accurate alignment and indicating mechanism for projectors of transparencies in fulfillment of the stated objects of this invention. Although but a single embodiment of this invention has been shown and described in detail, it will be understood that other forms and modifications are possible and changes may be made in the composition and arrangement of its parts and substitutions can be made without departing from the spirit of this invention as defined in the appended claims in which we claim:

1. In a projector for photogrammetric apparatus having a support, stage means on the support for adjustably holding a diapositive carrying a principal point mark, means including an optical system for projecting an image of the diapositive, and means for moving the stage means transversely of the axis of the optical system, the combination of an arm pivotally mounted on the support, a transparent plate carried by the arm, said plate having an index mark thereon and said arm being adapted to be selectively swung so as to place said plate substantially across the optical axis of said optical system adjacent to the diapositive, and stop means against which said arm engages to place the index mark in registry with said optical axis whereby the diapositive may be moved to place its principal point mark on said optical axis in alignment with said index mark, the relative position of said marks being revealed upon simultaneous projection into said image.

2. In a projector for photogrammetric apparatus having a support, stage means on the support for adjustably holding a diapositive carrying a principal point mark, means including an optical system for projecting an image of the diapositive, and means for moving the stage means transversely of the axis of the optical system, the combination of an arm pivotally mounted on the support, a transparent plate carried by the arm, said plate having an index mark thereon and said arm being adapted to be swung so as to place said plate substantially across the optical axis of said optical system closely adjacent to said diapositive, stop means for arresting motion of said arm when the plate is across the optical axis, and means for adjusting the arm to bring the index mark into alignment with said optical axis whereby the diapositive may be moved to place its principal point mark in registry with said index mark on said optical axis, the relative position of said marks being revealed by simultaneous projection into said image.

3. In a projector for photogrammetric apparatus having a support, stage means on the support for adjustably holding a diapositive carrying a principal point mark, means including an optical system for projecting an image of the diapositive, and means for moving the stage means transversely of the axis of the optical system, the combination of an arm pivotally mounted on the support for free movement of one end, a transparent plate carried by the arm, said plate having an index mark thereon and said arm being adapted to be swung so as to place said plate substantially across the optical axis of said optical system closely adjacent to said diapositive, stop means for arresting motion of said arm when the plate is across the optical axis, and means for adjusting said arm to bring said index mark into alignment with said optical axis including a rotatable eccentric pivot bushing for said arm and an adjustable abutment member engageable with the free end of said arm, said bushing and abutment member being constructed to move said arm in directions substantially normal to each other to align the index mark with the optical axis whereby the diapositive may be moved to place its principal point mark in registry with said index mark and optical axis, the relative position of said marks being revealed by simultaneous projection into said image.

4. In a projector for photogrammetric apparatus having a support and a casing extending thereover, stage means on the support for adjustably holding a diapositive carrying a principal point mark, means including an optical system for projecting an image of the diapositive, and means for moving the stage means transversely of the axis of the optical system, the combination of an arm pivotally mounted on said support, a transparent plate carried by the arm having thereon an index mark, said arm being so located that the index mark may be swung into registry with the optical axis of said optical system closely adjacent to said diapositive, an abutment member for arresting motion of the arm when the index mark is in registry with said optical axis, yielding biasing means acting on said arm to force it against said abutment member, and actuating means actively opposing said biasing means and connected to operate from exterior to said casing for moving said arm to inoperative position whereby the arm may be selectively moved to place the index mark in or out of alignment with said optical axis and the diapositive may be moved to obtain registry of both said marks, the alignment of said marks being revealed by simultaneous projection into said image.

JOHN V. SHARP.
OLIN W. BOUGHTON.

REFERENCES CITED

The following references are of record in the file of this patent:

UNITED STATES PATENTS

| Number | Name | Date |
| --- | --- | --- |
| 1,858,353 | Aldis | May 17, 1932 |
| 1,911,142 | Cahill | May 23, 1933 |
| 1,980,657 | Bauersfeld | Nov. 13, 1934 |
| 2,200,594 | Diggins et al. | May 14, 1940 |
| 2,264,341 | Kurtz | Nov. 18, 1941 |